United States Patent
Bokobza et al.

(10) Patent No.: US 10,065,604 B2
(45) Date of Patent: Sep. 4, 2018

(54) BRUSHING SYSTEM

(71) Applicants: Shmuel Bokobza, Kiryat Malachi (IL); Menachem Mendel Lipsker, Kiryat Malachi (IL)

(72) Inventors: Shmuel Bokobza, Kiryat Malachi (IL); Menachem Mendel Lipsker, Kiryat Malachi (IL)

(*) Notice: Subject to any disclaimer, the term of this patent is extended or adjusted under 35 U.S.C. 154(b) by 0 days.

(21) Appl. No.: 15/594,609

(22) Filed: May 14, 2017

(65) Prior Publication Data

US 2017/0369035 A1    Dec. 28, 2017

(30) Foreign Application Priority Data

Jun. 23, 2016 (IL) .......................................... 246445

(51) Int. Cl.
| | |
|---|---|
| *B60S 1/52* | (2006.01) |
| *B60S 1/02* | (2006.01) |
| *B60S 1/44* | (2006.01) |
| *A46B 13/06* | (2006.01) |
| *B60S 1/04* | (2006.01) |
| *A46B 13/00* | (2006.01) |
| *A46B 13/02* | (2006.01) |
| *B60S 1/50* | (2006.01) |
| *B60S 1/38* | (2006.01) |

(52) U.S. Cl.
CPC .......... *B60S 1/0491* (2013.01); *A46B 13/001* (2013.01); *A46B 13/02* (2013.01); *A46B 13/06* (2013.01); *B60S 1/50* (2013.01); *B60S 1/52* (2013.01); *B60S 1/524* (2013.01); *B60S 2001/3834* (2013.01)

(58) Field of Classification Search
CPC ...... B60S 2001/3831; B60S 2001/3834; B60S 1/522; B60S 1/524; B60S 1/44; B60S 1/0491; B60S 1/52; A47L 11/145; A47L 11/185; A47L 11/4041; A47L 11/4069; A47L 1/00; A47L 1/02; A61C 17/30; B08B 1/04; A46B 13/06
USPC ....... 15/250.04, 250.22, 250.41, 250.4, 50.3, 15/24, 29; 401/268, 197, 289; 418/206.1, 206.4, 187, 188

See application file for complete search history.

(56) References Cited

U.S. PATENT DOCUMENTS

| | | | | |
|---|---|---|---|---|
| 1,285,819 A | * | 11/1918 | Smith ..................... | F04C 14/26 417/310 |
| 1,479,272 A | * | 1/1924 | Young ...................... | B60S 3/06 15/29 |

(Continued)

FOREIGN PATENT DOCUMENTS

| | | | |
|---|---|---|---|
| DE | 2700527 | * | 9/1978 |
| DE | 20200401962 | | 4/2005 |
| RU | 1291099 | * | 2/1987 |

OTHER PUBLICATIONS

Machine translation of description portion of Russian publication 1291099, published Feb. 1987.*

*Primary Examiner* — Gary Graham
(74) *Attorney, Agent, or Firm* — Alphapatent Associates, Ltd; Daniel J. Swirsky

(57) ABSTRACT

A brushing system, including: a brush; and a hydraulic motor, for rotating the brush. The hydraulic motor is operable by pressurized water, and the pressurized water is administrable by outlets of the brush, thereby brushing of the brush is accompanied by the administrable water.

4 Claims, 4 Drawing Sheets

(56) References Cited

U.S. PATENT DOCUMENTS

| | | | | |
|---|---|---|---|---|
| 2,530,720 | A * | 11/1950 | Paulson | E01H 1/04 |
| | | | | 15/82 |
| 2,871,794 | A * | 2/1959 | Mosbacher | F04C 15/0026 |
| | | | | 29/888.023 |
| 3,605,154 | A * | 9/1971 | Dawkins | A61C 17/30 |
| | | | | 15/24 |
| 4,611,364 | A * | 9/1986 | Grubner | B60S 1/3801 |
| | | | | 15/250.03 |
| 5,323,508 | A * | 6/1994 | Sheldrake | A47L 1/02 |
| | | | | 15/103 |
| 7,257,855 | B2 * | 8/2007 | Mayo | B60S 1/52 |
| | | | | 15/250.01 |
| 8,032,976 | B2 * | 10/2011 | Nelson | B60S 1/3801 |
| | | | | 15/250.04 |
| 8,234,747 | B1 | 8/2012 | Ferguson | |
| 8,347,443 | B1 * | 1/2013 | Conrad | A46B 11/002 |
| | | | | 15/24 |
| 2006/0242774 | A1 * | 11/2006 | Schmid | A46B 13/008 |
| | | | | 15/29 |
| 2010/0089417 | A1 | 4/2010 | Nelson | |
| 2016/0129885 | A1 | 5/2016 | Hatzor | |

* cited by examiner

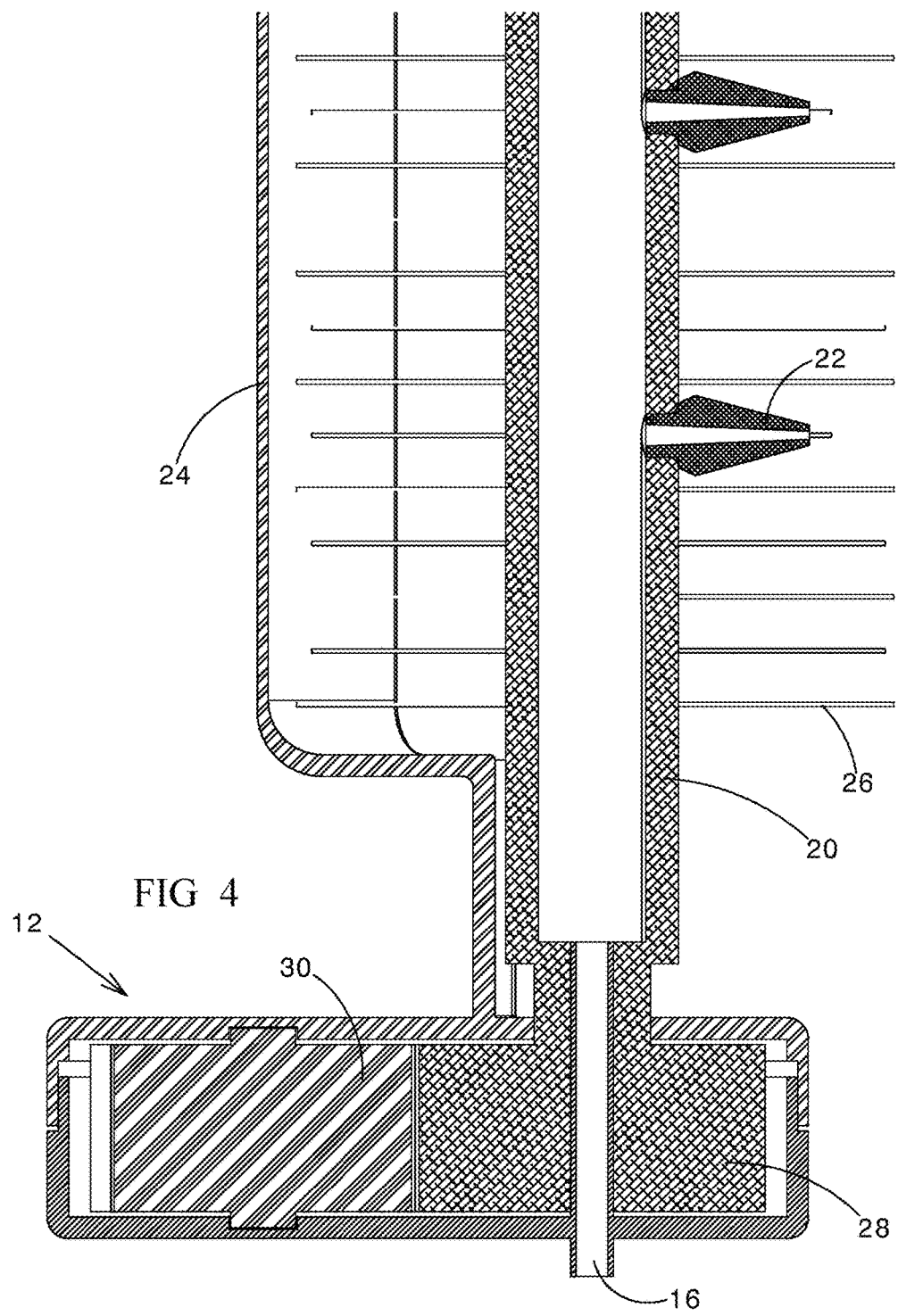

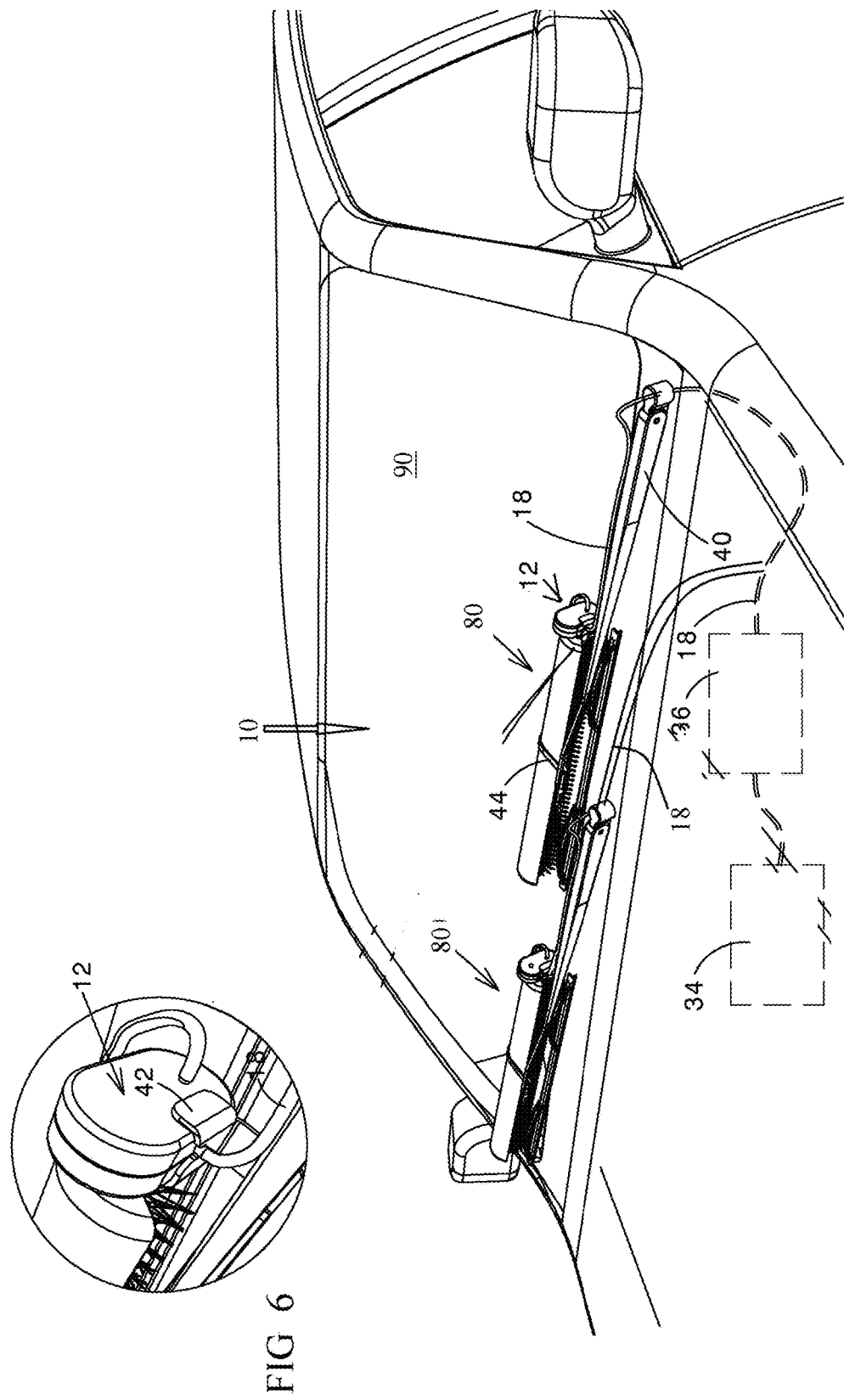

BRUSHING SYSTEM

CROSS-REFERENCE TO RELATED APPLICATIONS

This application claims the benefit of priority from Israel Patent Application No. 246445, filed Jun. 23, 2016, the disclosure of which is incorporated herein by reference.

TECHNICAL FIELD

The invention relates to the field of cleaning with water. More particularly, the invention relates to a system for cleaning a windshield.

BACKGROUND

Windshield wipers, especially of vehicles, conventionally receive linear motion only, and thus they conventionally do not include a brush. The brush is not simple, since it must be carried on the windshield wiper, thus it must be lightweight.

The simple solution for providing rotational movement is adding a motor. However, this makes the accessory heavy.

An additional solution is converting the linear motion of the windshield wiper to torque. However, the linear motion mechanism already is a relatively sensitive mechanism, and thus is not sufficient for supporting another mechanism.

SUMMARY

The invention provides a solution to the above-mentioned and other problems of the prior art.

In one aspect, the invention is directed to a brushing system, including:
 a brush; and
 a hydraulic motor, for rotating the brush.
The hydraulic motor is operable by pressurized water, and the pressurized water is administrable by outlets of the brush,
thereby brushing of the brush is accompanied by the administrable water.

BRIEF DESCRIPTION OF THE DRAWINGS

Embodiments, features, and aspects of the invention are described herein in conjunction with the following drawing figures:

FIG. 4 is a sectional view of the cylinder and hydraulic motor of FIGS. 1, 2, and 3.

FIG. 5 depicts the deployment of the elements of the windshield wiping system of FIG. 1.

FIG. 6 is a magnification of the side of the brush of FIG. 5.

The drawings are not necessarily drawn to scale.

DETAILED DESCRIPTION

The invention will be understood from the following detailed description of embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figures 1, 2:
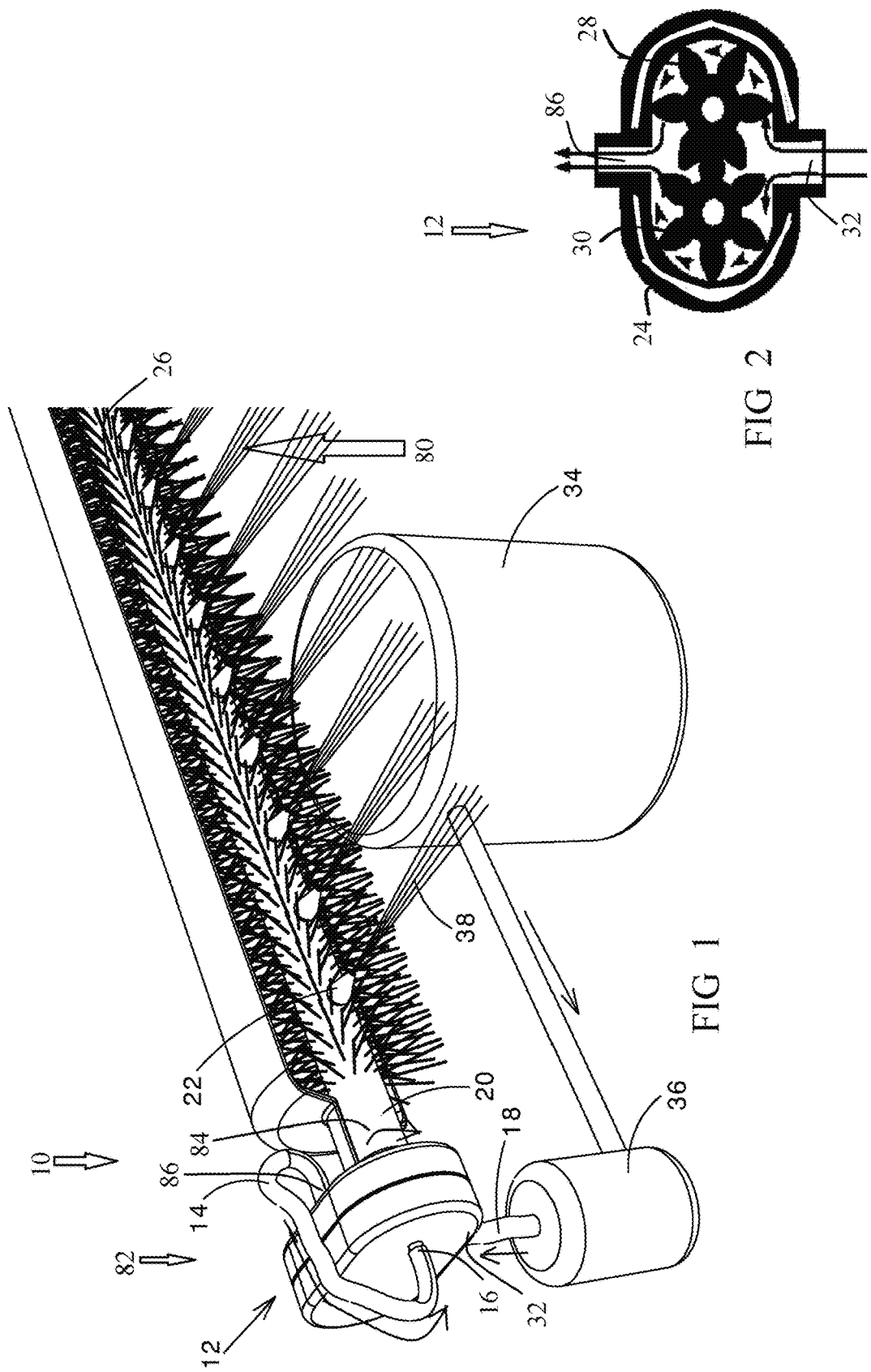
FIG. 1 depicts a windshield wiping system according to one embodiment of the invention.
FIG. 2 depicts a prior art hydraulic motor.

FIG. 1 depicts a windshield wiping system according to one embodiment of the invention.

A windshield brushing system 10 according to the invention includes one or more brushes 80, each including a rotatable hollow cylinder 20; bristles 26 extending from cylinder 20, for brushing the windshield; and nozzles 22 also extending from hollow cylinder 20, for administering water onto the windshield.

Windshield brushing system 10 further includes a mechanism 82 for rotating cylinder 20 of brush 80 as depicted by arrow 84 for applying the brushing, and for supplying the water flow for nozzles 22.

FIG. 2 depicts a prior art hydraulic motor.

The term "hydraulic motor" refers herein to an assembly for converting hydraulic pressure to torque.

FIG. 2 depicts a hydraulic motor of FIG. 2 including meshed gears 28 and 30, and housed in a closed package.

Water entering the inlet 32 of a hydraulic motor 12, cannot enter between gears 28 and 30, and thus flow around gears 28 and 30 by rotating gears 28 and 30.

Referring again to FIG. 1, mechanism 82 includes a water tank 34; a water pump 36, for drawing water from water tank 34; a hydraulic motor 12, for converting water pressure, directed from water pump 36 to the inlet 32 of hydraulic motor 12, to rotation 84 of cylinder 20; and a water pipe 14, for directing the water flow from outlet 86 of hydraulic motor 12 into an inlet 16 of hollow cylinder 20, for administering the water through hollow cylinder 20 by nozzles 22.

Figure 3:
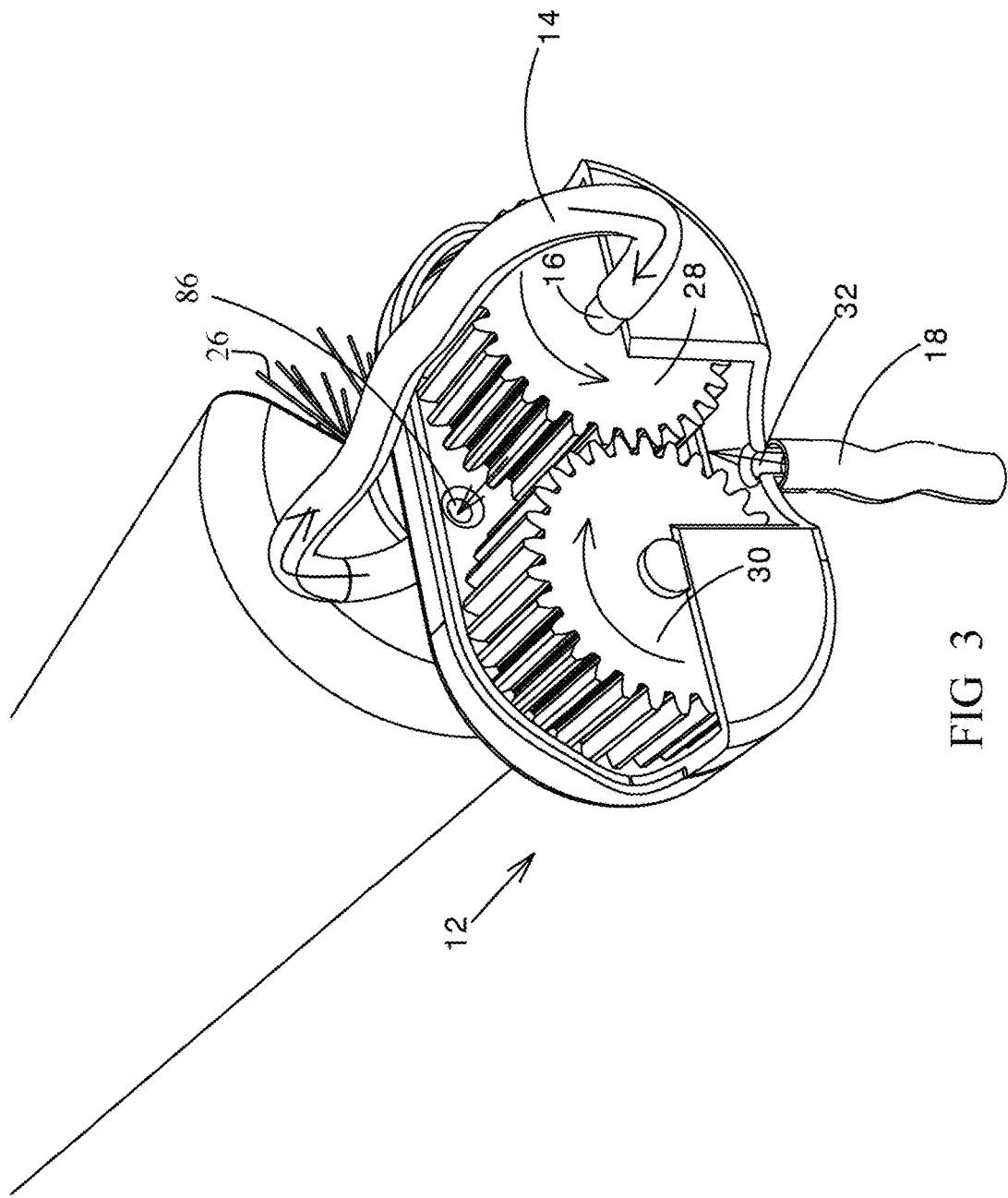
FIG. 3 depicts the inner elements of the hydraulic motor of FIGS. 1 and 2.

FIG. 3 depicts the inner elements of the hydraulic motor of FIGS. 1 and 2.

Cylinder 20 and gear 28 share the same axle, thus rotation of gear 28 rotates cylinder 20 and thus bristles 26.

FIG. 4 is a sectional view of the cylinder and hydraulic motor of FIGS. 1, 2, and 3.

Further, according to the embodiment of the figures, cylinder 20 and gear 28 share the same inner space, thus inlet 16 of hollow cylinder 20 and of gear 28 is the same inlet.

FIG. 5 depicts the deployment of the elements of the windshield wiping system of FIG. 1.

FIG. 6 is a magnification of the side of the brush of FIG. 5.

Water tank 34 and water pump 36 may be stationary, and thus may be disposed beyond the vehicle's engine cover. Each brush 80 may be fixed to the standard arm 40 and/or to the windshield wiper, for being supported thereby and for moving thereby.

Each of brushes 80 is connected to water pump 36 through a separate pipe 18. Pipes 18 rather than being rigid, must be durable to the normal motion of arms 40.

Thus, the invention is directed to a brushing system (10), including:
 a brush (80); and
 a hydraulic motor (12), for rotating the brush (80).

The brush (80) may be fixed to a movable vehicle windscreen wiper (14), and the hydraulic motor (12) may be stationary in relation to the windscreen wiper (14).

The hydraulic motor (12) is operable by pressurized water, and the pressurized water is administrable by outlets (22) of the brush (80), thereby brushing of the brush (80) is accompanied by the administrable water.

The hydraulic motor (12) may include at least two gears (28, 30), for being rotated by pressurized water.

The brush (80) may be fixed to one of the two gears (28, 30).

The inner volume of the one of the two gears (28, 30) may include a piping (14) for communicating therethrough an outlet (86) of the hydraulic motor (12) to the outlets (22) of the brush (80).

The brushing system (10) may further include water piping (14), for communicating the outlet (86) of the hydraulic motor (12) to the outlets (22) of the brush (80).

In the figures and/or description herein, the following reference numerals (Reference Signs List) have been mentioned:

numeral 10 denotes the brushing system, according to one embodiment of the invention;
numeral 12 denotes a hydraulic motor;
numeral 14 denotes a water pipe for directing the water flow from the outlet of the hydraulic motor into the inlet 16 of the hollow cylinder;
numeral 16 denotes an inlet of the hollow cylinder;
numeral 18 denotes the pipe between the water pump and the hollow cylinder;
numeral 20 denotes the hollow cylinder, for which the nozzles and bristles extend;
numeral 22 denotes a nozzle;
numeral 24 denotes the packaging of the hydraulic motor, for directing the water housed there;
numeral 26 denotes a bristle of the brush;
numerals 28 and 30 denote meshed gears of the hydraulic motor; the water cannot flow through the meshing;
numeral 32 denotes the inlet of the hydraulic motor;
numeral 34 denotes the water tank;
numeral 36 denotes the water pump;
numeral 38 denotes water splash provided by a nozzle;
numeral 40 denotes a windshield wiper or the arm thereof;
numeral 42 denotes a fastener of the hydraulic motor to the windshield wiper or arm thereof;
numeral 44 denotes a fastener of the brush to the windshield wiper arm or arm thereof;
numeral 80 denotes the brush; each brush is fixed to one windshield wiper or arm thereof;
numeral 82 denotes the mechanism for rotating the cylinder of the brush, and for supplying the water flow to the nozzles;
numeral 84 denotes an arrow;
numeral 86 denotes the outlet of the hydraulic motor; and
numeral 90 denotes the windshield.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A brushing system, comprising:
a brush; and
a hydraulic motor, comprising meshed gears (28, 30) housed in a package, for not allowing pressurized water entering an inlet (32) of said package to flow between said meshed gears (28, 30), thereby directing the water to flow around said gears (28, 30), for rotating said brush,
wherein said hydraulic motor is operable by pressurized water, and
wherein said pressurized water is administrable by water outlets of said brush,
thereby brushing of said brush is accompanied by said administrable water,
wherein an inner volume of said one of said two gears comprises a piping for communicating therethrough an outlet of said hydraulic motor to said water outlets of said brush.

2. A brushing system according to claim 1,
wherein said brush is fixed to a movable vehicle windscreen wiper, and
wherein said hydraulic motor is stationary in relation to said windscreen wiper.

3. A brushing system according to claim 1, wherein said brush is fixed to one of said two gears.

4. A brushing system, comprising:
an elongated brush; and
a hydraulic motor, comprising meshed gears (28, 30) housed in a package, for not allowing pressurized water entering an inlet (32) of said package to flow between said meshed gears (28, 30), thereby directing the water to flow around said gears (28, 30), for rotating said elongated brush,
wherein a first end (16) of said elongated brush comprises a water inlet, for receiving said pressurized water from an outlet of said hydraulic motor, and
wherein said pressurized water is pressurized along and within a hollow cylinder (20) of said elongated brush being administrable by water outlets of said brush distributed therealong,
thereby brushing of said brush is accompanied by said pressurized water being administrated through said water outlets rotating together with said brush.

* * * * *